Figure 1:
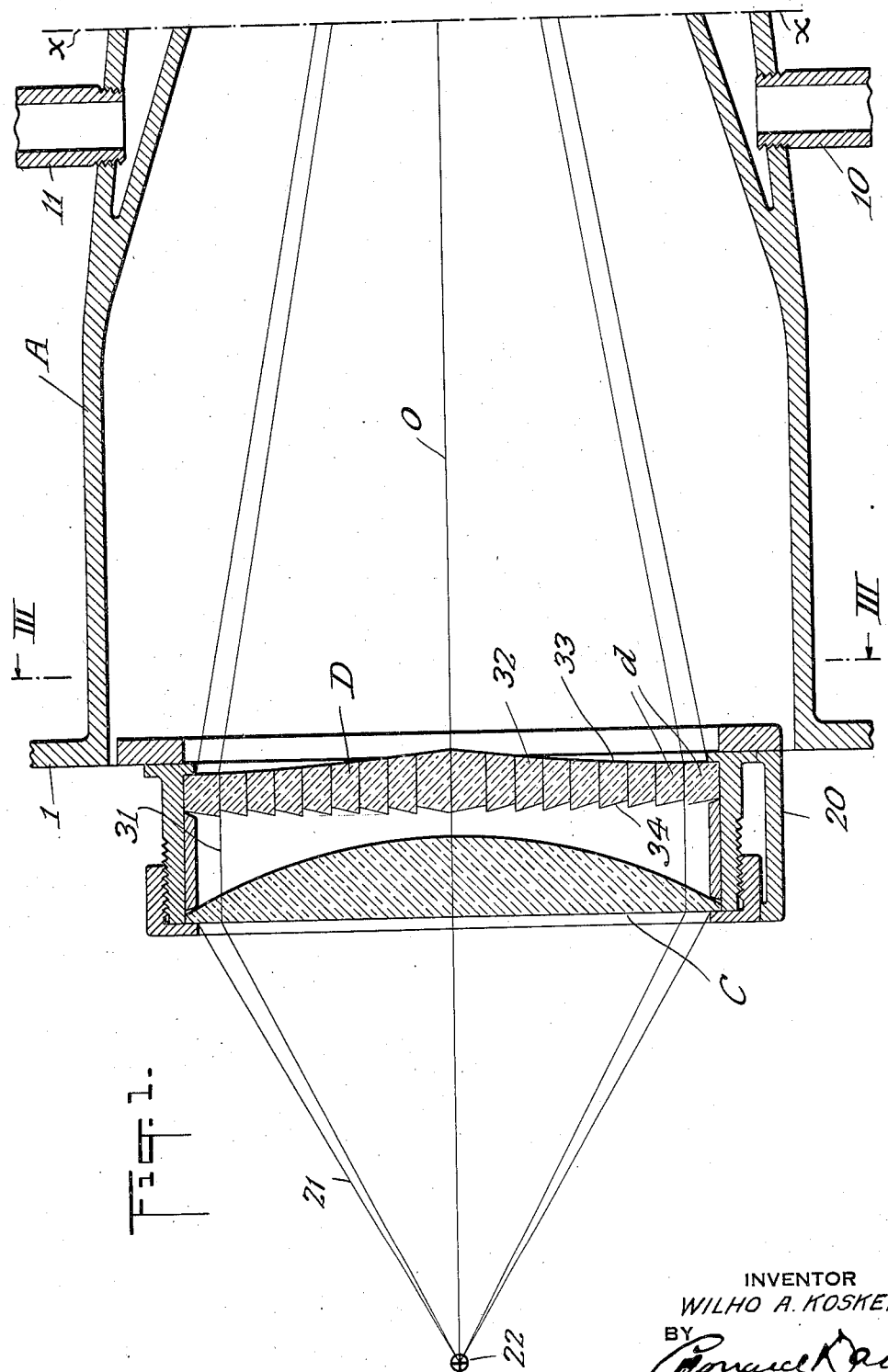

June 6, 1933.  W. A. KOSKEN  1,912,377
ELIMINATION OF INFRA-RED RAYS IN PROJECTORS
Filed Dec. 2, 1929  2 Sheets-Sheet 1

INVENTOR
WILHO A. KOSKEN.
BY
ATTORNEY

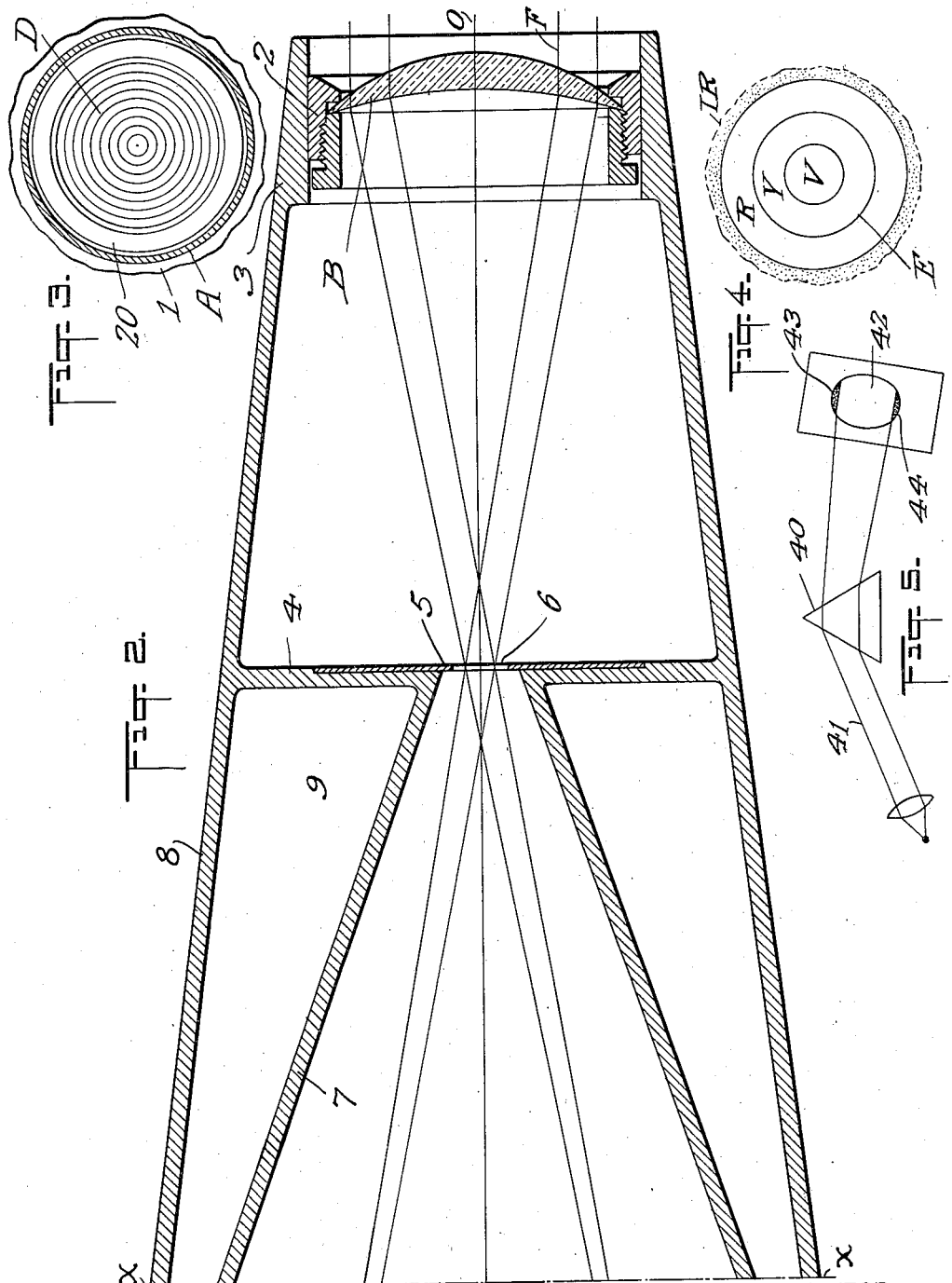

Patented June 6, 1933

1,912,377

UNITED STATES PATENT OFFICE

WILHO A. KOSKEN, OF NEW YORK, N. Y., ASSIGNOR TO WILHO A. KOSKEN, INC., A CORPORATION OF NEW YORK

ELIMINATION OF INFRA-RED RAYS IN PROJECTORS

Application filed December 2, 1929. Serial No. 410,904.

This invention relates to the production of a practical beam of light for projectors primarily derived from an artificial source of light of multichromatic character such as the white light derived from the crater of an arc which shall be substantially free from the invisible infra-red heat rays.

For the last twenty years at least, college physics have described and there has been practiced in most colleges the dispersion of a beam of polychromatic light into an assemblage of its elementary constituent rays with the infra-red rays diverted outwardly from the visible red rays and these visible rays constituting the visible spectrum have been reassembled and recombined in a region of illumination in the form of white light. In connection with this well known functioning of physics, it has also been well known and has been described that this practice is capable of performance within the realm of practical prisms only in connection with very thin beams, whereas if dispersion of a thick beam of light should be attempted with a dispersing prism, that the dispersion would be effected only on the fringes of the projected beam, that is, along one edge of the region of illumination, after passing through the prism, there would be a fringe of red, then a large area of white and upon the opposite edge a fringe of violet. Little deduction is required to determine the truth, namely, that only a small percentage of the entire thick beam of light has actually been resolved into its constituent elementary rays. It is of course conceivable that prisms of dimensions measured in yards across their optical bases might be capable of dispersing a light beam of considerable thickness but at the expense of impracticability for any commercial projection purposes and optically functioning in no way different from the well known dispersion described in all good works on physics as a well known phenomenon.

Objectively, I propose to utilize the broad and well known principle of dispersion and the recombining of the visible spectrum to form white light for the purpose of producing a source of cool white light particularly suitable for motion picture projection, and my purpose is to do so in a practical manner and by means of apparatus and by a method outside of and not disclosed in any textbook on physics.

To this end, I propose the breaking up of a beam of polychromatic light of sufficient size for practical projection purposes into thin shells preferably in the form of conical shells having a common axis and the individual dispersion of the light in each individual shell into its elemental conical shells in such a way that the spectrum produced by each shell in the form of Newton's rings, so-called, are coincident or superimposed to complete a solid circular area at a predetermined cross-sectional plane, whereby the infra-red or heat rays must be directed outwardly from the coincident area of illumination by the spectrum rays, and I propose to collect these infra-red rays upon a water-cooled heat absorbing light tunnel. I then propose to recombine the remaining visible rays into the form of white light and project the same into a region suitable for the production of a secondary source of light as upon a motion picture film.

I am well aware of the fact that unless quartz be employed in my optical transparent means, that it is well nigh impossible to transmit to the region of the film to be projected any of the ultra-violet rays and I therefore contemplate as within the scope of my invention the elimination of ultra-violet rays by selective absorption, although I have purposely theoretically centered these rays in the plane of coincidence to which I have referred.

In general, I propose to employ lamp houses and the combination of parts going to make up a complete apparatus for supplying a projection beam of visible light.

The above will be pointed out more particularly in the following claims which are directed to an illustrative embodiment of my invention solely for purposes of illustration and not limitation. This illustrative embodiment of my invention is described in the following specification in connection with the accompanying drawings which form a part hereof and in the figures of which like characters designate corresponding parts.

In the drawings, Figs. 1 and 2 matched together along the line of division X—X constitute a vertical longitudinal section of apparatus embodying the invention, the same being partly diagrammatic; Fig. 3 is a cross-section with parts broken away taken through the plane of line III—III of Fig. 1 and drawn to a reduced scale; Fig. 4 is a diagram illustrating the coincidence illumination in accordance with my invention; and Fig. 5 is a diagram illustrating the effect of ordinary prismatic dispersion.

Referring now more in detail to the drawings, a light tunnel A is preferably formed as a unitary casting with a lamp house, the wall 1 of which is illustrated. At the far end of the light tunnel I provide a recombining lens means B removably mounted in the lens mount 2 in good heat conducting contact with the muzzle 3 of the light tunnel A. I prefer that the cross partition 4 be provided in the light tunnel and I may fit the same with a diaphragm 5 providing the light opening 6 of the desired configuration, usually circular, and of the desired diameter. Within the light tunnel and preferably cast as a part thereof is a conical shell-like partition 7 more sharply convergent than the light rays presently to be described and together with the walls 8 and partition 4 forming a water chamber 9 through which cooling water may be circulated from any suitable impelling device such as a pump, not shown, by means of the entrance and exit ducts 10 and 11. Suitably mounted on the wall 1 is the optical mounting frame 20 shown as mounting both the condenser lens C preferably of quartz and the special optical disperser D. The disperser D and the condenser lens means C function upon the conical beam 21 from any suitable source of polychromatic light 22 which may be the crater of an arc or any other usual source suitable for mounting and suitably mounted within the lamp house of which the wall 1 is illustrated. It is of course to be understood that my invention is not limited to functioning upon solely the conical beam 21 demarked by the spherical angle resulting from the positioning of the parts but I contemplate the employment of all usual adjuncts to an artificial source of light.

The rays of light from the source 22 are changed into parallel rays 31 by the condenser C although it is for a purpose presently to be described that certain features of my invention do not require this parallel ray disposition.

The means D is a series of concentric rings $d$ each formed as a ring-like solid of revolution about the axis O and is such a ring as would be generated by such revolution of one of the trapezoids 32. By reason of the paralleling of the rays 31 the rings $d$ function more nearly completely without dead zones as might be the case on account of their trapezoidal cross-section in responding to divergent rays such as the rays 21. It is of course to be understood that the invention is not limited to the initial formation of parallel rays 31 although it is preferred that they be substantially parallel. The elemental angle of the faces 33 and 34 for each prismatic ring thus constituted is ground so that taking into consideration the optical substance or substances of which these rings are constituted, a spectrum E would be reproduced at some cross-plane such as that of the diaphragm 5 with the violet indicated as V, the yellow indicated as Y and the red indicated as R, and so that obeying the law of dispersion, all the infra-red is outside of the red and is indicated by IR. (See Fig. 4.) In grinding these rings $d$ and fabricating them, consideration must be given to the angle of deflection as well as of the dispersion power of the optical ring and I contemplate that it may be necessary in some rings to combine two rings each of a different optical substance, such as, I contemplate the combining of one ring of flint glass with one ring of crown glass or one ring of quartz with one ring of either of the aforementioned substances. In this way it is possible to break up the entire beam which must have a visible light value capable of practical utilization into as many concentric shells as is desired and so that each shell may be of a sufficient thinness to effect substantially complete dispersion and the casting of substantially all of the infra-red heat rays out of each shell against the interior face of the heat absorbing wall 7 which is preferably blackened or otherwise treated to effect heat absorption. In connection with this splitting up of a light beam into a plurality of thin shells, it is to be understood that the degree of incomplete dispersion and absorption of infra-red may be reduced to the percentage desired, whereas what has been proposed in college physics and other publications is the use of an ordinary prism such as the prism 40 of Fig. 5 functioning upon a single beam of light 41 which by dispersion produces a central zone 42 of white light with a fringe of red 43 and a fringe of violet 44. In apparatus of the type of Fig. 5 it is of course only the infra-red corresponding to the fringe of red 43 which is dispersed out of any re-combining zone. Described differently, the central zone 42 contains not only the visible light but all of the infra-red rays originally therein. This results in the elimination of only a small percentage of the infra-red or heat rays.

It is possible that due to the dispersion on the contrary effected by my invention as described in connection with Figs. 1 and 2 that the ultra-violet rays focused to the axial line O at the locality of the diaphragm 5 diverge away from the recombining means B and are absorbed upon the muzzle walls of my light tunnel. In any event, the ultra-violet light rays only in percentage can pass the recombining means B which functions to recombine the elemental or spectrum illumination E into a beam F of white light substantially free from infra-red and substantially free from ultra-violet rays and suitable for projection purposes.

What I claim and desire to secure by United States Letters Patent is:

1. The method of illuminating a circumscribed region substantially without heating the same, which comprises collecting a cone of light from a localized source substantially into a cylinder of substantially parallel rays; resolving said cylinder of light of practical cross-sectional area into a plurality of thin shells suitable for dispersion; dispersing the light in each shell into an assemblage of its elementary constituent rays; causing the direction of said constituent rays to effect substantial coincidence in a predetermined transverse plane so far as the visible rays are concerned; and diverting the dark heat rays outwardly from said assemblage; and recombining the remaining rays in said region of illumination.

2. In optical apparatus for the elimination of dark heat rays, a localized source of polychromatic light; lens means for concentrating the light from said source substantially into a cylinder of parallel rays; a plurality of ring shaped optical prisms of revolution of varying diameters nested one about the other and each of a prismatic angle and of substance formation capable of dispersing a thin narrow shell of light into an assemblage of its elementary constituent rays and of outwardly diverting the dark heat rays from said assemblage.

3. In a projector means, a water-cooled light tunnel having a conically convergent wall; a localized source of polychromatic light; lens means for collecting a cone of light from said source and transforming the same into substantially parallel rays; a dispersing optical means in the form of a plurality of ring shaped prisms of revolution nested about a common axis and adapted to disperse respective thin shells of light each corresponding to a ring and to project the same in its elemental constituents, the infrared in large quantity against said water-cooled walls, and the remaining rays into substantial coincidence within the light opening of the structure.

4. In projector means, a localized source of polychromatic light; lens means for collecting a cone of light from said source and transforming said cone of light substantially into a cylinder of parallel light rays; a dispersing optical means in the form of a plurality of ring-shaped prisms of revolution nested about a common axis and having cylindrical walls, the elements of which are parallel to said parallel rays and which are adapted to disperse their respective thin cylindrical shells of light in their entirety making up said cylinder of rays and to project the dispersed light in its elemental constituents, the infra-red in large percentage in each shell outwardly divergent from the visible rays of each said shell, and the visible rays of all of said shells into substantial focus or coincidence at a predetermined axial locality; a window providing an aperture at said focal locality limiting the passage therethrough to the visible rays; heat absorbing walls mounting said window and disposed circumferentially about the axis to catch and absorb the infra-red rays outwardly dispersed; and a relatively large area combining lens at a locality beyond said focal point for combining the divergent visible rays after their passage through said aperture.

WILHO A. KOSKEN.